(12) United States Patent
Cheng et al.

(10) Patent No.: US 11,906,876 B2
(45) Date of Patent: Feb. 20, 2024

(54) ALL-PHOTONIC BOOLEAN LOGIC DEVICE BASED ON PHASE CHANGE STRAIGHT WAVEGUIDE AND FULL BINARY LOGIC IMPLEMENTATION METHOD THEREOF

(71) Applicant: HUAZHONG UNIVERSITY OF SCIENCE AND TECHNOLOGY, Hubei (CN)

(72) Inventors: Xiaomin Cheng, Hubei (CN); Zhuli He, Hubei (CN); Yunlai Zhu, Hubei (CN); Han Li, Hubei (CN); Xiangshui Miao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/910,835

(22) PCT Filed: Jul. 22, 2021

(86) PCT No.: PCT/CN2021/107752
§ 371 (c)(1),
(2) Date: Sep. 12, 2022

(87) PCT Pub. No.: WO2023/283981
PCT Pub. Date: Jan. 19, 2023

(65) Prior Publication Data
US 2023/0221619 A1    Jul. 13, 2023

(30) Foreign Application Priority Data
Jul. 12, 2021    (CN) .......................... 202110785784.3

(51) Int. Cl.
*G02F 3/00*    (2006.01)

(52) U.S. Cl.
CPC .......... *G02F 3/00* (2013.01); *G02F 2201/307* (2013.01); *G02F 2203/11* (2013.01); *G02F 2203/50* (2013.01)

(58) Field of Classification Search
CPC ..... G02F 3/00; G02F 3/02; G02F 1/21; G02F 1/0126; G02F 1/0147; G02F 1/0134;
(Continued)

(56) References Cited

U.S. PATENT DOCUMENTS

2020/0341503 A1* 10/2020 Rios Ocampo ........... G02F 3/00

FOREIGN PATENT DOCUMENTS

| CN | 109655975 | 4/2019 |
| CN | 111684343 | 9/2020 |

(Continued)

OTHER PUBLICATIONS

Wang et al "Overview of Phase-Change Materials Based Photonic Devices"; IEEE Access, vol. 8, 2020. (Year: 2020).*

*Primary Examiner* — Jie Lei
(74) *Attorney, Agent, or Firm* — JCIPRNET

(57) ABSTRACT

The disclosure provides a straight waveguide phase change all-photonic Boolean logic device and a full binary logic implementation method thereof, including a ridge- shape straight waveguide structure, two phase change functional units near the two ends and a Bragg grating between two phase change functional units. The phase change functional units and Bragg grating are situated on the ridge of the waveguide. The write and read optic pulses have different wavelengths. The Bragg grating are designed to reflect the write optical pulse and transmit the read pulse, so that write pulses input from the two ends only act on the phase change functional unit closest to that end, and read pulse can go through the whole device from input end to output end. In terms of the logic implementation method, with three-step
(Continued)

write operation, 16 full Boolean logic functions can be implemented in this device.

10 Claims, 6 Drawing Sheets

(58) Field of Classification Search
 CPC ...... G02F 1/025; G02F 7/00; G02F 2201/307; G02F 2201/305; G02F 2203/11; G02F 2203/50; G02F 2203/22; G06E 1/04; G06E 1/045
 USPC ...... 359/108, 107, 10, 11, 34, 279, 563, 569
 See application file for complete search history.

(56) References Cited

FOREIGN PATENT DOCUMENTS

| | | |
|---|---|---|
| CN | 112649999 | 4/2021 |
| CN | 112713242 | 4/2021 |
| JP | 2009128718 | 6/2009 |

\* cited by examiner (a)

(b)

Amorphous state            Crystalline state

ALL-PHOTONIC BOOLEAN LOGIC DEVICE BASED ON PHASE CHANGE STRAIGHT WAVEGUIDE AND FULL BINARY LOGIC IMPLEMENTATION METHOD THEREOF

CROSS-REFERENCE TO RELATED APPLICATION

This application is a 371 of international application of PCT application serial no. PCT/CN2021/107752, filed on Jul. 22, 2021, which claims the priority benefit of China application no. 202110785784.3, filed on Jul. 12, 2021. The entirety of each of the above mentioned patent applications is hereby incorporated by reference herein and made a part of this specification.

BACKGROUND

Technical Field

The disclosure relates to the cross-technical field of optics, microelectronics, and logic operations, and more particularly relates to a all-photonic Boolean logic device based on phase change straight waveguide and full binary logic implementation method thereof.

Description of Related Art

Since modern times, the demand for information computing and storage in human society has grown exponentially, but the traditional von Neumann computing architecture has a bottleneck that is difficult to break through, in which computing and storage are separated and there is a mismatch in efficiency. The in-memory computing technology, which directly uses memory for computing operation, is considered to be one of the most promising solutions to break through the bottleneck of the conventional computing technology. The phase change material, which is represented by the chalcogenide compound, has two stable states, a crystalline state and an amorphous state, and may be converted between the two through electrical and optical methods, and is non-volatile, is a strong competitor to break the traditional von Neumann computing architecture in the field of the integration of storage and computing. The reconfigurable computing technology that has emerged in line with the development of semiconductors can implement the spatial mapping of algorithms to computing engines, and is compatible with basic processor-driven manners and high-performance computing. The basic concept thereof is to emphasize the reuse of resources. At present, the reconfigurable concept is combined with the non-volatility of memristor to implement various electrical Boolean logic operations.

At the same time, Moore's Law faces an insurmountable physical gap. The speed response of electronic devices cannot meet the increasingly high manufacturing and living requirements. In addition, many optoelectronic devices have the issue of low conversion efficiency of optical and electrical signals. Compared with electrical devices, optical devices have advantages such as high speed, large bandwidth, parallel operation (wavelength division multiplexing), and insensitivity to electromagnetic interference. If data storage and processing can be performed through optical methods, that is, all-photonic signal processing, the optical-electrical-optical conversion process can be avoided, and the all-photonic information technology with low power consumption, high speed, high bandwidth, high reliability, and large capacity can be implemented.

There is a huge difference in optical properties between the crystalline state and the amorphous state of the phase change material, and the states may be regulated through optical pulses and have high repeatability and stability. At present, the research on phase change optical logic is at the initial stage. Although there have been precedents for implementing an optical logic function using the phase change material, some electrical devices are used during the implementation process, which does not belong to all-photonic logic, and the output is also electrical logic signals. Cascading in an all-photonic circuit cannot be implemented, and there are defects in the combination of devices to implement complex logic functions. Also, in one device, only two to three types of binary Boolean logic can be implemented, so the degree of integration still needs to be improved. There are also researches that have proved that some binary optical Boolean logic operations can be implemented using a single phase change unit, but so far, it is still impossible to implement full binary Boolean logic operations in a single all-photonic logic device, which seriously hinders the practical evolution process of phase change optical logic.

SUMMARY OF THE DISCLOSURE

In view of the defects of the prior art, the objective of the disclosure is to provide a straight waveguide phase change all-photonic Boolean logic device and a full binary logic implementation method thereof, which aim at solving the issue that it is still impossible to implement all binary all-photonic Boolean logic operations in a single all-photonic logic device, which seriously hinders the practical evolution process of phase change optical logic.

In order to achieve the above objective, in a first aspect, the disclosure provides a all-photonic Boolean logic device based on phase change straight waveguide, which includes a straight waveguide, two phase-change functional units, and a Bragg grating.

An upper part of the straight waveguide has a ridge, and the two phase-change functional units and the Bragg grating are all disposed on the ridge. The Bragg grating is located between the two phase-change functional units and is connected with the two phase change functional units in a straight line. Based on an evanescent wave coupling effect, an optical pulse signal with a relatively large power is input into the straight waveguide, and the phase change functional unit absorbs a part of an optical power and generates a crystalline or amorphous phase change to implement a write operation. A difference in transmittance of a detection optical signal when the phase change functional unit is in a crystalline state or in an amorphous state is used to implement reading of a crystallization state thereof. When the write operation is performed on the phase change functional unit, the optical pulse signal transmitted from one side of the Bragg grating does not act on the phase change functional unit on the other side.

Through writing and reading operations of the phase change functional unit, the straight waveguide phase change all-photonic Boolean logic device can implement functions of all 16 types of binary Boolean logic operations.

It should be noted that the optical pulse signal with the relatively large power mentioned in the above paragraph refers to the optical pulse signal that can enable the phase change functional unit to generate a crystalline or amorphous phase change.

In a possible example, the material of the phase change functional unit is a chalcogenide compound that can generate a crystalline or amorphous reversible phase change under the action of different optical pulses.

In a possible example, the real part of the complex refractive index of the phase change functional unit is greater than the real part of the complex refractive index of the straight waveguide, so that a part of light propagating in the straight waveguide enters the phase change functional unit for propagation. The imaginary part of the complex refractive index of the phase change functional unit is not 0, so that the phase change functional unit absorbs the light propagated therein.

In a possible example, the 16 types of binary Boolean logic operations include logic true, logic false, P, Q, not P, not Q, P and Q, P and not Q, P or Q, P or not Q, P implies Q, P implies not Q, P inverse implies Q, P inverse implies not Q, P exclusive OR Q, and P exclusive NOR Q logic operations.

In a possible example, the optical pulse signal is input into a straight waveguide side where the phase change functional unit is located, and the phase change functional unit heats up according to the optical power absorbed thereby to may generate the crystalline or amorphous phase change, so that the phase change functional unit is finally in the crystalline state or in the amorphous state, so as to perform the write operation on the phase change functional unit. Through setting the parameter of the Bragg grating, after the optical pulse signal incident from one end of the straight waveguide passes through the Bragg grating, the transmitted optical pulse signal does not act on the phase change functional unit on the other side of the straight waveguide.

In a possible example, a detection signal is input into one end of the straight waveguide, the intensity of the optical signal output from the other end of the straight waveguide is detected and compared with the intensity of the input detection signal to determine transmittance of the two phase-change functional units, so as to perform the read operation on the two phase-change functional units. The detection signal is an optical pulse or a continuous light with a relatively low power that does not change the state of the phase change functional unit. Through setting the parameter of the Bragg grating, the detection signal is not affected by the Bragg grating.

In a possible example, each of the two phase-change functional units includes a phase change functional unit layer and a protective layer from bottom to top. The protective layer is used to prevent the phase change functional unit from being oxidized.

In a possible example, the real part of the complex refractive index of the phase change functional unit is greater than the real part of the complex refractive index of the straight waveguide and the imaginary part of the complex refractive index of the phase change functional unit being not 0. Here, the complex refractive index refers to the complex refractive indexes of the phase change functional unit and the straight waveguide under two wavelengths of the pump optical pulse signal and the detection signal.

In an optional example, the optical pulse signal is one of a first optical pulse signal or a second optical pulse signal. The first optical pulse signal is an optical signal that can partially crystallize the phase change functional unit from the amorphous state or can amorphize the phase change functional unit from a partially crystalline state. The second optical pulse signal is an optical signal that can maintain the amorphous state of the phase change functional unit in the amorphous state or can amorphize the phase change functional unit from the partially crystalline state.

In an optional example, each phase change functional unit includes a GST phase change functional unit layer and an indium tin oxide protective layer from bottom to top. The material of the GST phase change functional unit layer is $Ge_2Sb_2Te_5$.

It can be understood that in the embodiment of the disclosure, $Ge_2Sb_2Te_5$ is used as an example for the chalcogenide compound that can generate the crystalline or amorphous reversible phase change, but is not used as any limitation to the protection scope of the disclosure. Any chalcogenide compound that can generate the crystalline or amorphous reversible phase change should fall within the protection scope of the material of the phase change functional unit adopted in the disclosure.

In an optional example, the material of the straight waveguide is $Si_3N_4$.

In an optional example, the material of the Bragg grating is the same as the material of the straight waveguide.

In an optional example, the wavelength of the optical pulse signal is 1550 nm, the wavelength of the detection signal is 1650 nm, the depth of the Bragg grating is 400 nm, the period length is 380 nm, and the number of periods is 16.

It can be understood that the wavelength of the optical pulse signal, the wavelength of the detection signal, and the specific parameter of the Bragg grating can be other conditions, as long as the two conditions that after the optical pulse signal incident from one end of the straight waveguide passes through the Bragg grating, the transmitted optical pulse signal does not act on the phase change functional unit on the other side of the straight waveguide, and the detection signal is not affected by the Bragg grating are met.

In a second aspect, the disclosure provides a full binary logic implementation method of the straight waveguide phase change all-photonic Boolean logic device given in the first aspect, which includes the following steps.

Preset that when the detection signal detects that two phase change functional units are both in an amorphous state, logic output by the detection signal after reading the two phase change functional units is 1, and logic outputs in other cases are all 0.

A three-step operation is preset to respectively input the corresponding logic values into the two phase-change functional units. Operation manners of 16 types of binary Boolean logic operations are preset to respectively input the logic values into the two phase change functional units in combination with the three-step operation, and then input the detection signal into one side of a straight waveguide to read states of the two phase change functional units through detecting the intensity of the signal output from the other side, and comparing with the intensity of the input detection signal to obtain the result of the Boolean logic operation, so as to implement a full binary Boolean logic operation. Inputting the logic values into the phase change functional units refers to inputting corresponding write optical pulse signals into the phase change functional units using the three-step operation.

Specifically, the three-step operation is preset to respectively input the corresponding logic values into the two phase-change functional units. When logic 0 is input into the first phase change functional unit, in the first operation step the first optical pulse signal is input into the straight waveguide from the end where the first phase change functional unit locates, in the second operation step the second optical pulse signal is input into the straight waveguide from the end where the first phase change functional unit locates, in the third operation step the first optical pulse signal is input into the straight waveguide from the end where the first phase change functional unit locates. When logic 1 is input into the first phase change functional unit, in the first operation step the second optical pulse signal is input into the straight waveguide from the end where the first phase change functional unit locates, and the optical pulse signal is not input into the straight waveguide in both the second operation step and the third operation step. When logic 0 is input into the second phase change functional unit, in the first operation step the second optical pulse signal is input into the straight waveguide from the end where the second phase change functional unit locates, and the optical pulse signal is not input into the straight waveguide from the end where the second phase change functional unit locates in both the second and third operation steps. When logic 1 is input into the second phase change functional unit, in the first operation step, the second operation step, and the third operation step, the first optical pulse signal is input into the straight waveguide from the end where the second phase change functional unit locates.

In an optional example, if the optical pulse signal is used in each operation step in the three-step operation, an effective time is preset for the optical pulse signal. The preset effective time refers to a time sufficient for the phase change functional unit to heat up based on the optical power absorbed thereby, thereby generating a possible crystalline or amorphous phase change.

In an optional example, the preset operation manners of the 16 types of binary Boolean logic operations to respectively input the logic values into the two phase change functional units in combination with the three-step operation specifically includes the following.

(1) For the logic true operation, in the first operation step, logic 0 and logic 1 are respectively input into the first phase change functional unit and the second phase change functional unit; and the optical pulse signal is not input into the straight waveguide from the ends where the two phase change functional units are located in both the second operation step and the third operation step.

(2) For a logic false operation, in the first operation step, logic 1 and logic 0 are respectively input into the first phase change functional unit and the second phase change functional unit; and the input optical pulse signal is not input into the straight waveguide from the ends where the two phase change functional units are located in both the second operation step and the third operation step.

(3) For a P operation, in the first operation step, logic 0 and a logic value of P are respectively input into the first phase change functional unit and the second phase change functional unit; and the input optical pulse signal is not input into the straight waveguide from the ends where the two phase change functional units are located in both the second operation step and the third operation step.

(4) For a Q operation, in the first operation step, logic 0 and a logic value of Q are respectively input into the first phase change functional unit and the second phase change functional unit; and the input optical pulse signal is not input into the straight waveguide from the ends where the two phase change functional units are located in both the second operation step and the third operation step.

(5) For a not P operation, in the first operation step, a logic value of P and logic 1 are respectively input into the first phase change functional unit and the second phase change functional unit; and the input optical pulse signal is not input into the straight waveguide from the ends where the two phase change functional units are located in both the second operation step and the third operation step.

(6) For a not Q operation, in the first operation step, a logic value of Q and logic 1 are respectively input into the first phase change functional unit and the second phase change functional unit; and the input optical pulse signal is not input into the straight waveguide from the ends where the two phase change functional units are located in both the second operation step and the third operation step.

(7) For a P and Q operation, in the first operation step, logic 0 and logic value of Q are respectively input into the first phase change functional unit and the second phase change functional unit; in the second operation step, logic P is input into the first phase change functional unit, and the optical pulse signal is not input into the straight waveguide from the end where the second phase change functional unit is located; and in the third operation step, the optical pulse signal is not input into the straight waveguide from the ends where the two phase change functional units are located.

(8) For a P and not Q operation, in the first operation step, logic 0 and logic value of $\overline{P}$ are respectively input into the first phase change functional unit and the second phase change functional unit; in the second operation step, the logic value of $\overline{Q}$ is input into the second phase change functional unit, and the optical pulse signal is not input into the straight waveguide from the end where the first phase change functional unit is located; and in the third operation step, the optical pulse signal is not input into the straight waveguide from the ends where the two phase change functional units are located.

(9) For a P or Q operation, in the first operation step, logic 0 and logic value of P are respectively input into the first phase change functional unit and the second phase change functional unit; in the second operation step, a logic value of Q is input into the second phase change functional unit, and the optical pulse signal is not input into the straight waveguide from the end where the first phase change functional unit is located; and in the third operation step, the optical pulse signal is not input into the straight waveguide from the ends where the two phase change functional units are located.

(10) For a P or not Q operation, in the first operation step, logic 0 and logic value of $\overline{Q}$ are respectively input into the first phase change functional unit and the second phase change functional unit; in the second operation step, a logic value of $\overline{P}$ is input into the first phase change functional unit, and the optical pulse signal is not input into the straight waveguide from the end where the second phase change functional unit is located; and in the third operation step, the optical pulse signal is not input into the straight waveguide from the ends where the two phase change functional units are located.

(11) For a P implies Q operation, in the first operation step, logic 0 and a logic value of P are respectively input into the first phase change functional unit and the second phase change functional unit; in the second operation step, a logic value of Q is input into the second phase change functional unit, and the optical pulse signal is not input into the straight waveguide from the end where the first phase change functional unit is located; and in the third operation step, the optical pulse signal is not input into the straight waveguide from the ends where the two phase change functional units are located.

(12) For a P implies a not Q operation, in the first operation step, logic 0 and a logic value of $\overline{Q}$ are respectively input into the first phase change functional unit and the second phase change functional unit; in the second operation step, a logic value of P is input into the first phase change functional unit, and the optical pulse signal is not input into the straight waveguide from the end where the second phase change functional unit is located; and in the third operation step, the optical pulse signal is not input into the straight waveguide from the ends where the two phase change functional units are located.

(13) For a P inverse implies Q operation, in the first operation step, logic 0 and logic value of P are respectively input into the first phase change functional unit and the second phase change functional unit; in the second operation step, a logic value of $\overline{Q}$ is input into the second phase change functional unit, and the optical pulse signal is not input into the straight waveguide from the end where the first phase change functional unit is located; and in the third operation step, the optical pulse signal is not input into the straight waveguide from the ends where the two phase change functional units are located.

(14) For a P inverse implies not Q operation, in the first operation step, logic 0 and a logic value of Q are respectively input into the first phase change functional unit and the second phase change functional unit; in the second operation step, a logic value of $\overline{P}$ is input into the first phase change functional unit, and the optical pulse signal is not input into the straight waveguide from the end where the second phase change functional unit is located; and in the third operation step, the optical pulse signal is not input into the straight waveguide from the ends where the two phase change functional units are located.

(15) For a P XOR Q operation, in the first operation step, the logic value of P and the logic value of P are respectively input into the first phase change functional unit and the second phase change functional unit; in the second operation step, a logic value of Q is input into the second phase change functional unit, and the optical pulse signal is not input into the straight waveguide from the end where the first phase change functional unit is located; and in the third operation step, a logic value of Q is input into the first phase change functional unit, and the optical pulse signal is not input into the straight waveguide from the end where the second phase change functional unit is located.

(16) For a P XNOR Q operation, in the first operation step, logic 0 and the logic value of P are respectively input into the first phase change functional unit and the second phase change functional unit; in the second operation step, a logic value of P and a logic value of Q are respectively input into the first phase change functional unit and the second phase change functional unit; and in the third operation step, a logic value of Q and a logic value of $\overline{P}$ are respectively input into the first phase change functional unit and the second phase change functional unit.

In an optional example, before performing each binary Boolean logic operation, the second optical pulse signal is respectively input into two ends of the straight waveguide, so that the two phase change functional units both reach the amorphous state, so as to perform a reset operation on the two phase change functional units.

In general, compared with the prior art, the above technical solutions conceived by the disclosure have the following beneficial effects.

The disclosure provides a straight waveguide phase change all-photonic Boolean logic device and a full binary logic implementation method thereof. Compared with the electrical logic gate, the optical device logic gate has characteristics such as high speed, insensitivity to electromagnetic interference, and parallel operation, while avoiding the optical-electrical-optical conversion process in the current application, further improving the system bandwidth, and reducing the system power consumption. The phase change material is used as the storage medium, which has good long-term non-volatility. The unique phase change property of the phase change material is combined with the concept of reconfigurable computing, which not only has the flexibility of reconfigurable computing, but also has the characteristics of fast switching speed and good non-volatility of the phase change material, which is of great significance to the research on computing in memory. For some phase change optical logic devices that have emerged at present, the disclosure provides a simple straight waveguide structure with a simple process and only two ends, so that the operation is relatively simple, and due to the symmetry, during output, the input and output ends may be interchanged without affecting the operation to be performed. The functions of the 16 types of binary Boolean logic operations can be implemented through the three operation steps, which greatly improves the working efficiency of the device.

DETAILED DESCRIPTION OF DISCLOSED EMBODIMENTS

Figure 1:
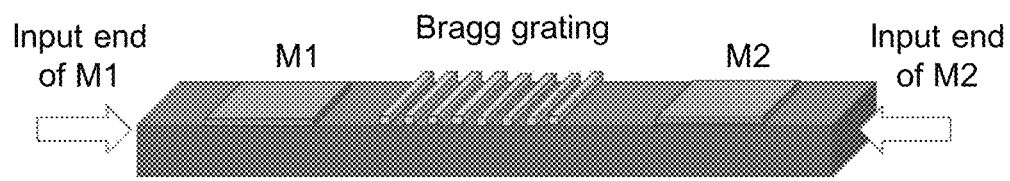
FIG. 1 is a structural schematic view of the all-photonic logic device provided by the disclosure. A straight waveguide structure has two phase change functional units M1 and M2 with protective layers and a Bragg grating structure.

In order for the objectives, technical solutions, and advantages of the disclosure to be clearer, the disclosure will be further described in detail below with reference to the drawings and embodiments. It should be understood that the specific embodiments described herein are only used to explain the disclosure, but not to limit the disclosure.

In view of the above defects or improvement requirements of the prior art, the disclosure provides a straight waveguide bidirectional input all-photonic Boolean logic device based on a phase change material and a full binary logic implementation method thereof, which use a more advantageous optical method to solve the technical bottleneck encountered in the integration of all-photonic storage and computing currently, and improves the reconfigurability and the logic integration of the phase change optical logic device.

The disclosure includes, but is not limited to, a bidirectional input phase change all-photonic logic device structure based on a Bragg grating and all logic implementation operation methods thereof. The device structure is composed of the straight waveguide, the phase change functional units, and the waveguide Bragg grating.

Since light tends to enter a material with a larger real part of a complex refractive index when transmitted in different materials, when a waveguide material with smaller refractive index is covered with a phase change material with larger refractive index, a part of the light enters the phase change material for propagation, that is, evanescent wave coupling. Under the action of a suitable optical pulse, the phase change material can implement the conversion between the crystalline state and the amorphous state, and the two states can both be stably maintained and are nonvolatile. Accordingly, the state of the phase change functional unit may be switched through pump optical pulses representing different logic signals. In the crystalline state and the amorphous state, the refractive index of the phase change material has a large difference, wherein a part of the imaginary part differs by more than ten times, which means that the phase change material in different states has a large difference in light transmittance. Therefore, an optical pulse or continuous light with a smaller emission power that is not enough to change the state of the phase change material is used as a probe light, and the transmittance thereof is detected to read the state of the phase change material.

The implementation of an all-photonic operation must be based on some optical structures, and the disclosure mainly involves a waveguide Bragg grating structure. The waveguide Bragg grating controls the propagation of light through periodically modulating the refractive index of a waveguide. In silicon-based photonic integration, many photonic devices make use of the filtering property of the waveguide grating, such as a modulator, a switch, and a grating coupler. Through changing the periodic structure of the grating, that is, the grating morphology, grating devices with different functions may be obtained.

In order to simplify the device structure, the Bragg grating on the straight waveguide is used in the disclosure to filter the optical pulses input at two ends, and the periodic grating structure is covered on the waveguide, which essentially forms the periodic modulation of the effective refractive index of a waveguide mode. The parameter of the grating structure is optimized, so that the structure can reflect the pump optical pulses with specific wavelengths input at two ends of the straight waveguide. Therefore, when the pump optical pulses are input from different ends, a write operation of the corresponding phase change functional unit may be implemented. However, the grating structure has no obvious effect on the probe light with another wavelength, so the probe light may be input from one end of the straight waveguide and output from the other end.

Reconfigurable computing refers to a computing organization form that can implement the spatial mapping of an algorithm to a computing engine. The operation manner of the disclosure includes that through controlling the width of a write optical pulse with a certain power, pulses with different pulse widths are obtained to simulate optical pulse signals with signal values "0" and "1". Preferably, two pulses with different powers are adopted to respectively control write and read operations of a phase change unit. The power value of a write pulse is larger, and the phase change functional unit may be crystallized or be amorphized through evanescent wave coupling. The power of a read pulse (or continuous light) is smaller, which is not enough to crystallize or amorphize the phase change functional unit through evanescent wave coupling and is only used to read the state of the phase change functional unit.

It should be noted that the real part of the complex refractive index of the phase change functional unit selected in the disclosure is greater than the real part of the complex refractive index of the straight waveguide and the imaginary part of the complex refractive index of the phase change functional unit is not 0, wherein the complex refractive index mentioned in the disclosure refers to the complex refractive index of the phase change functional unit and the straight waveguide under two signal wavelengths of an optical pulse signal and a detection signal. More specifically, the wavelength parameters of the optical pulse signal and the detection signal, and the material parameters of the phase change functional unit, the protective layer, or the straight waveguide selected in the disclosure are all examples and do not limit the protection scope of the disclosure. All optical wavelengths and corresponding materials that satisfy the complex refractive index relationship of the phase change functional unit and the straight waveguide under the two signal wavelengths of the optical pulse signal and the detection signal, which is that the real part of the complex refractive index of the phase change functional unit is greater than the real part of the complex refractive index of the straight waveguide and the imaginary part of the complex refractive index of the phase change functional unit is not 0, shall belong to the protection scope of the disclosure.

It can be understood that the structural parameters of the Bragg grating selected in the disclosure are only for illustration. The parameters of the Bragg grating that satisfy the requirements that after the optical pulse signal incident from one end of the straight waveguide passes through the Bragg grating, the transmitted optical pulse signal does not act on the phase change functional unit on the other end of the straight waveguide, and the detection signal is not affected by the Bragg grating should belong to the protection scope of the disclosure.

Embodiment 1

Figure 2:
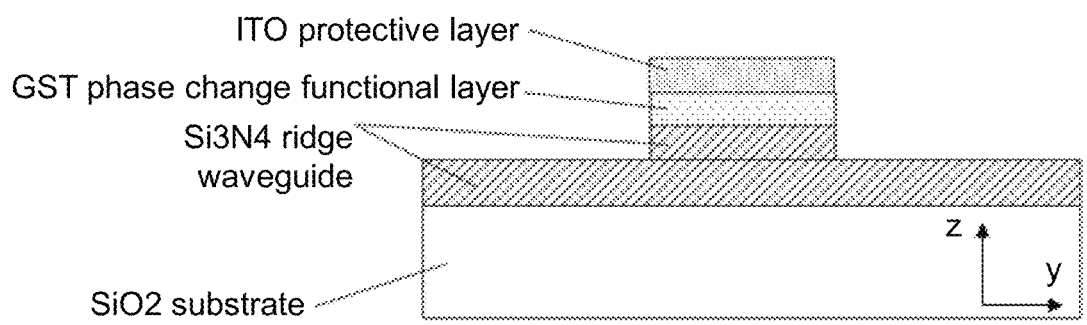
FIG. 2 is the cross-sectional view at the phase change functional unit perpendicular to the light propagation direction provided by the disclosure. The adopted materials are respectively silicon dioxide ($SiO_2$), silicon nitride ($Si_3N_4$), phase change material, and indium tin oxide (ITO) from bottom to top.

The embodiment is shown in FIG. 1 and FIG. 2. FIG. 1 is a schematic view of the device structure. Two ends of a straight waveguide are respectively two input ends, M1 and M2 are respectively the two phase change functional units, and a middle section of the straight waveguide is covered with a periodic Bragg grating structure. FIG. 2 is a cross-sectional view at the phase change functional unit perpendicular to an incident direction of an optical pulse. The phase change optical logic device includes a silicon dioxide ($SiO_2$) substrate, a silicon nitride ridge straight waveguide ($Si_3N_4$) and the Bragg grating structure thereon, a $Ge_2Sb_2Te_5$ phase change functional unit layer, and an indium tin oxide (ITO) protective layer. The embodiments of the disclosure all select the more common phase change material $Ge_2Sb_2Te_5$, but are not limited to such phase change material, and a preparation process thereof is as follows.

In a first step, a layer of silicon nitride with a thickness of 150 nm is sputtered on a 0.5 mm thick silicon dioxide substrate using magnetron sputtering.

In a second step, a photoresist is spin-coated on the surface of the obtained thin film, and using the designed mask, the required straight waveguide pattern is obtained through photolithography, development, magnetron sputtering, and peeling. During the manufacturing process, the ridge waveguide is first prepared, and the structure of the grating is then overlaid thereon. The grating is mainly obtained through photolithography and etching. Since the size of the grating is prone to errors during the preparation process, the requirement for the precision of the process is extremely high.

In a third step, the required $Ge_2Sb_2Te_5$ functional unit area pattern and the indium tin oxide (ITO) protective layer are prepared by photolithography.

In a fourth step, the $Ge_2Sb_2Te_5$ phase change optical logic device is used to construct a logic operator, and the logic function of the device is checked and tested under a pump-probe light optical test system. The test temperature is room temperature. According to a designed input operation mode, the device is crystallized and amorphized by the input of a pump light, and the state of the device is read through a probe light.

It should be noted that the above preparation method is not unique, and any method that can prepare to obtain the structures shown in FIG. 1 and FIG. 2 should fall within the protection scope of the disclosure.

Embodiment 2

The waveguide Bragg grating structure is adopted in the device structure to reflect the pump light with a specific wavelength. When the pump light at an input end of M1 enters the waveguide and acts on the phase change functional unit M1, the pump light is reflected by the waveguide Bragg grating, so that the light intensity at the phase change functional unit M2 is greatly reduced, and the phase change functional unit M2 cannot be changed. Therefore, the pump light input from the input end of M1 only acts on the phase change functional unit M1, and the same applies to the pump light input from the input end of M2, so that each phase change functional unit is only modulated by one pump optical pulse. When reading, the probe light with a wavelength different from 1550 nm is adopted to be input from one of the ends, and the power change thereof is detected from the other end. In the embodiment, the wavelength of the pump optical pulse is selected to be 1550 nm, the structure of the waveguide Bragg grating is optimized on this premise to meet the required conditions, and a probe optical pulse with a suitable wavelength is selected.

The material of the grating is the same as that of the waveguide, both of which are made of silicon nitride. Therefore, the parameters of the grating structure that may be optimized are mainly the grating period length, the number of periods, and the grating depth. In the FDTDSolution simulation software, nested sweeps are performed on the grating period length and the grating depth, and the number of grating periods is then individually scanned. In the following description and drawings, Z represents the grating depth in nm, period represents the grating period length in nm, Nperiod represents the number of grating periods, and wavelength represents the wavelength in nm.

Figure 3:
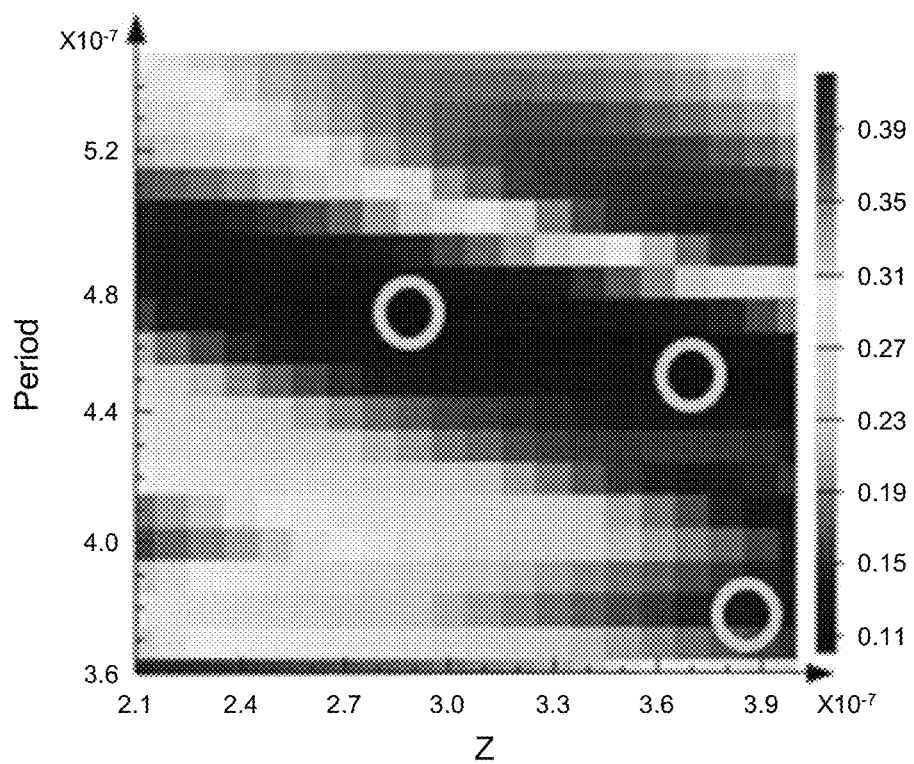
FIG. 3 is statistics of transmittance and reflectivity (percentage relative to a light source) of the waveguide Bragg grating structure for a TE mode light source with a wavelength of 1550 nm under different parameters provided by the disclosure, where (a) is the transmittance and (b) is the reflectivity.
Figure 3:
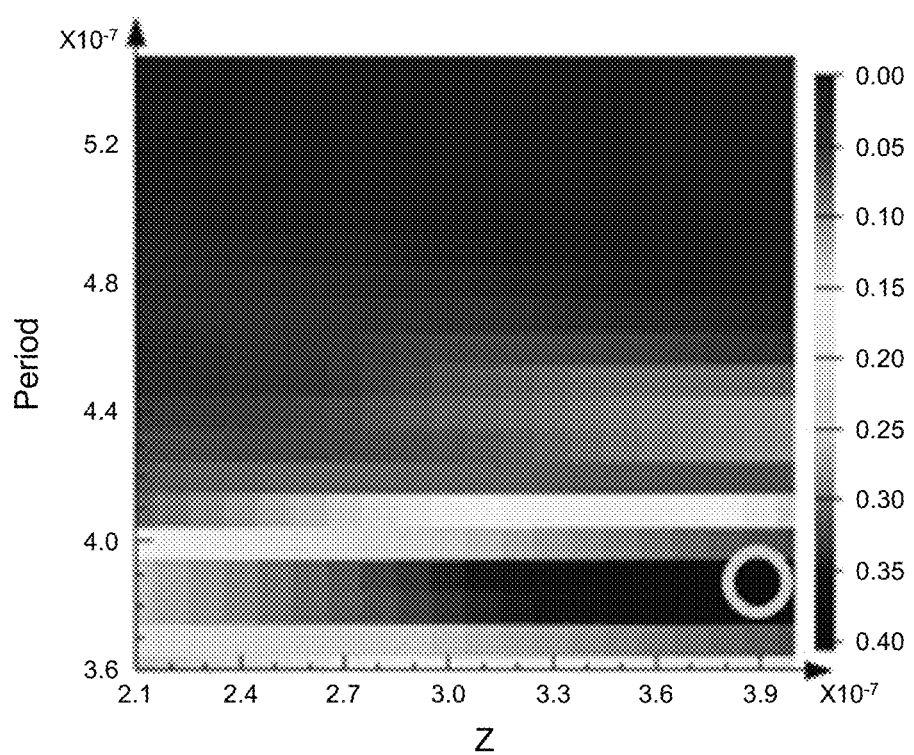

The two parameters, the grating period length and the grating depth, are first optimized. As shown in FIG. 3, (a) and (b) are respectively the statistics of transmittance and reflectivity (relative to the percentage of a light source) of the waveguide Bragg grating structure to a TE mode light source with the wavelength of 1550 nm under different parameters. It can be seen from (a) that the minimum transmittance value is at the three points, Z=290 nm, period=470 nm; Z=370 nm, period=460 nm; and Z=400 nm, period=380 nm, which is about 11%. It can be seen from (b) that the maximum reflectance value is at Z=400 nm, period=380 nm, which is about 40%. Based on the above results, the two optimized parameters are respectively determined to be the grating depth Z=400 nm and the period length period=380 nm.

Figure 4:
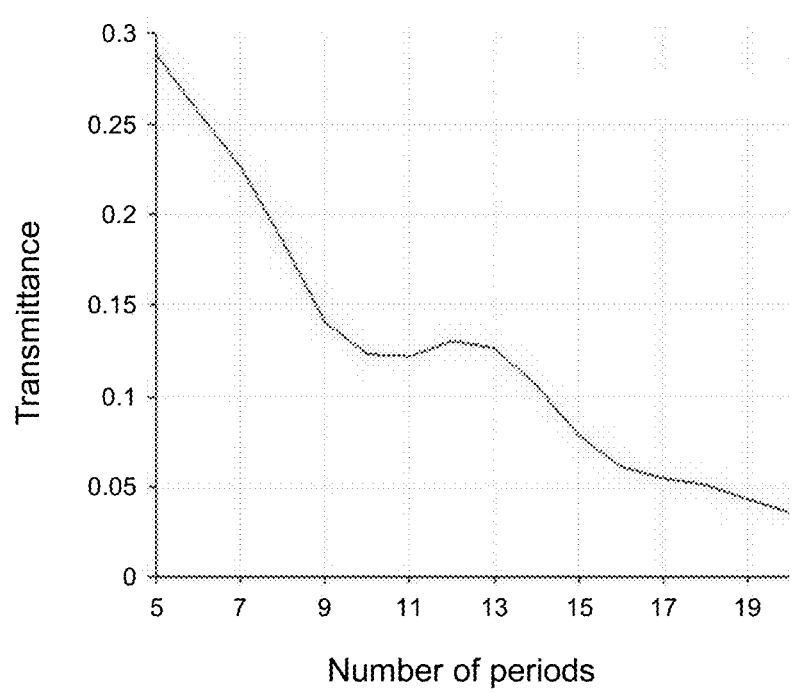
FIG. 4 is a statistical graph of scanning transmittance of the optimized number of waveguide Bragg grating periods provided by the disclosure.

Since excessive grating periods causes the straight waveguide to be too long, which greatly increases the length of the device, the transmittance of the light source with the wavelength of 1550 nm is scanned by the Bragg grating when the number of grating periods Nperiod is within the range of 4 to 20. FIG. 4 is a statistical graph of scanning transmittance of an optimized number of grating periods. It can be seen that the transmittance generally decreases with the increase of the number of grating periods, but the rate of decline significantly decreases after 16 periods. Considering the size of the device, the Bragg grating with 16 grating periods is adopted. At this time, the optimization of the three structural parameters is completed, which are respectively the grating depth Z=400 nm, the period length period=380 nm, and the number of grating periods being 16. Through Bragg reflection in the straight waveguide, the transmittance of light with the wavelength of 1550 nm may reach a minimum of close to 5%. Since the Bragg grating on the waveguide is reflected by evanescent wave coupling, light with a specific wavelength cannot be completely eliminated, and the transmittance is close to 5% instead of 0.

Figure 5:
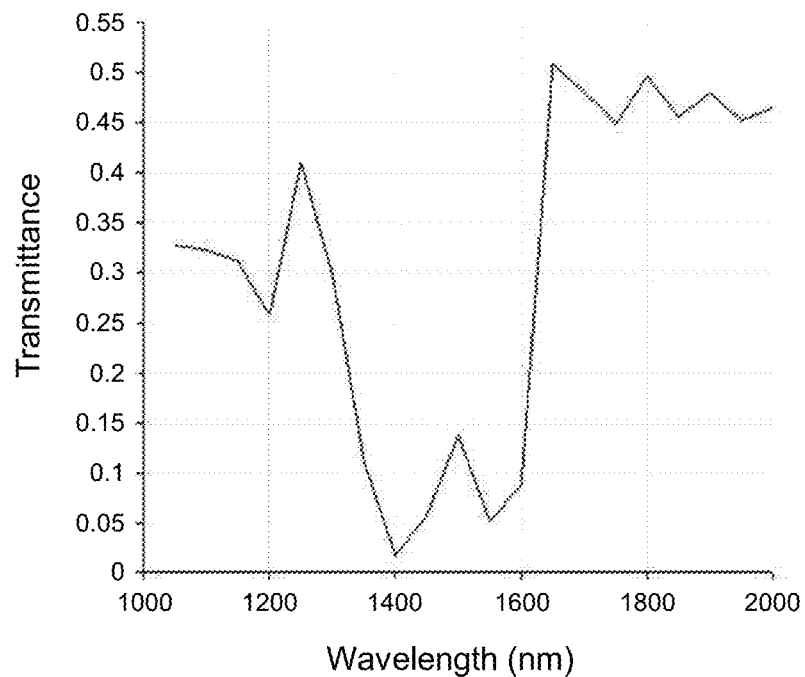
FIG. 5 is a spectral scan view of the transmittance of the waveguide Bragg grating for the light with wavelength from 1000 nm to 2000 nm provided by the disclosure.

The transmittance of light within the wavelength range of 1000 nm to 2000 nm under the structure is scanned to find the wavelength with the maximum transmittance that is not affected by the grating as the probe light. It can be seen from FIG. 5 that when the wavelength is 1650 nm, the transmittance is the highest, reaching more than 50% (a waveguide medium itself has attenuation to light), which is ten times that of the light with the wavelength of 1550 nm and may be regarded as not being affected by the grating. Therefore, the probe light with the wavelength of 1650 nm may be selected to read the state of the device.

Embodiment 3

Figure 6:
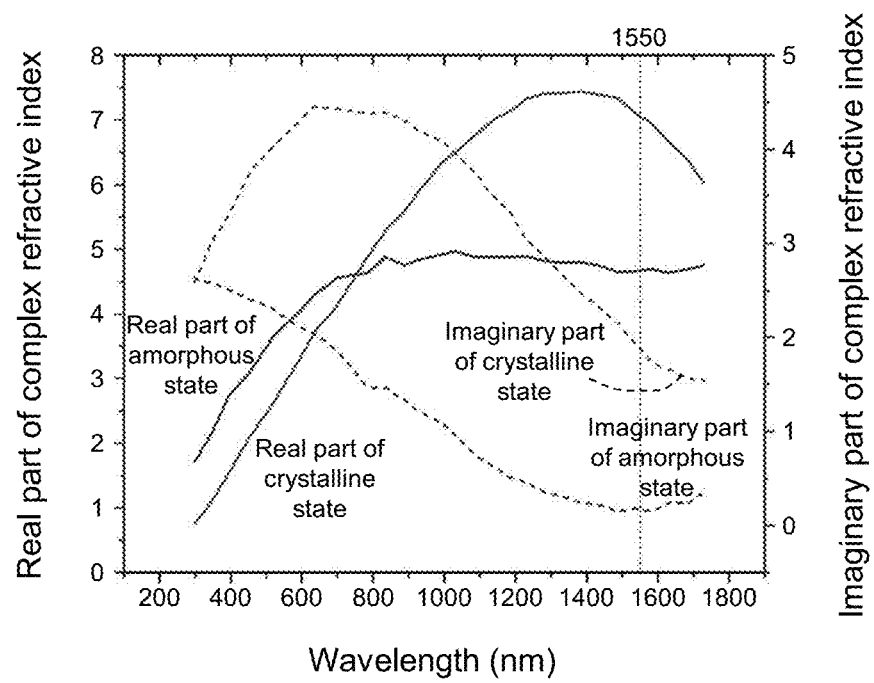
FIG. 6 is a spectrogram of the complex refractive index of the phase change material $Ge_2Sb_2Te_5$ in crystalline state and amorphous state under normal temperature provided by the disclosure.

Since light tends to enter a material with a larger real part of a complex refractive index when transmitted in different materials, when a waveguide material with a smaller refractive index is covered with a phase change material with a larger refractive index, a part of the light enters the phase change material for propagation, that is, evanescent wave coupling. In this way, on the one hand, since the imaginary part of the complex refractive index of the phase change material is not 0, light is absorbed, so affected by pulsed light with a certain power, the temperature rises to generate a phase change (crystallization or amorphization). As such, an optical pulse with a relatively large power may be input to implement the write operation to the phase change functional unit. On the other hand, when the phase change material is in the crystalline state and the amorphous state, due to normal incidence, transmittance T=1−R−A. FIG. 6 is a spectrogram of the complex refractive index of the phase change material Ge2Sb2Te5 in the crystalline state and the amorphous state. It can be seen that in the waveband around 1550 nm, the refractive index R and the absorbance A (positively correlated with the imaginary part) of the phase change material in the crystalline state are greater than those in the amorphous state. Therefore, the transmittance in the crystalline state is less than that in the amorphous state, so a part of the light transmitted in the phase change unit is affected by changes in the transmittance thereof. When light with the same power is incident, an output optical power coupled with the phase change material in the crystalline state is smaller, and an output optical power coupled with the phase change material in the amorphous state is larger. As such, an optical pulse with a relatively small power may be input, and an outgoing light thereof after evanescent wave coupling is collected to analyze the state of the phase change material, so as to implement the read operation of the state of the phase change functional unit.

Figure 7:
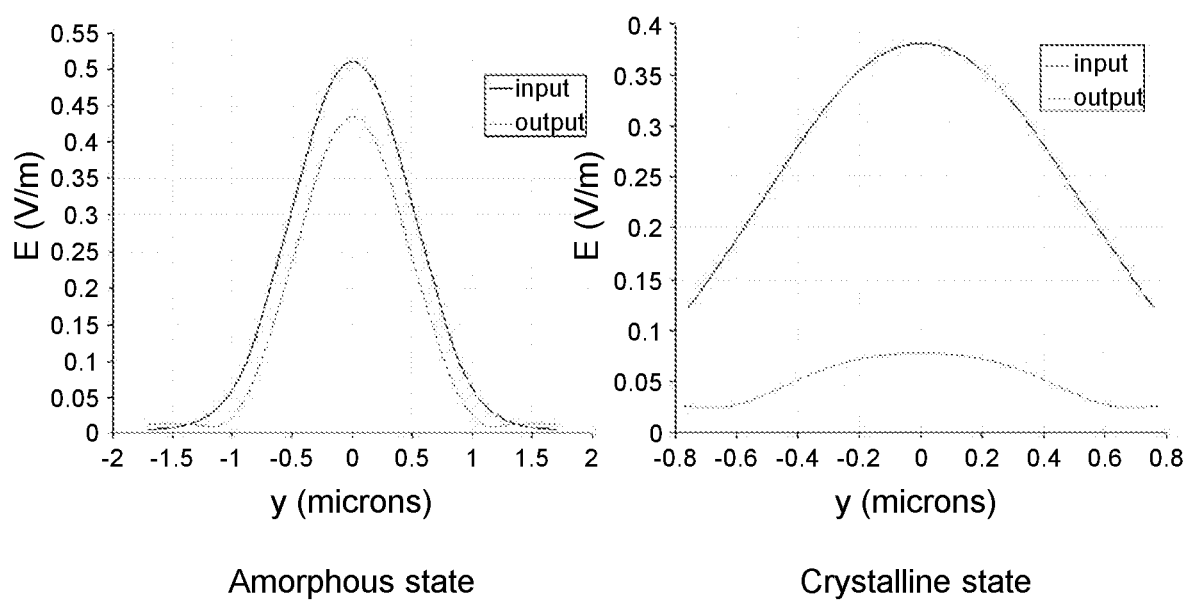
FIG. 7 is the schematic view of the comparison of electric field intensities simulation before and after inputting an optical pulse into the phase change functional unit provided by the disclosure.

FIG. 7 shows comparison simulation of normalized electric field intensities at a phase change layer before and after the 1550 nm optical pulse in the waveguide passes through the phase change unit when the phase change material is respectively in the crystalline state and the amorphous state in the phase change functional unit (taking $Ge_2Sb_2Te_5$ as an example). It can be clearly seen that the transmittance of the phase change material in the amorphous state is high, and the electric field intensity is basically not attenuated. The transmittance of the phase change material in the crystalline state is low, and the amplitude of the light pulse is greatly attenuated after being emitted.

Figure 8:
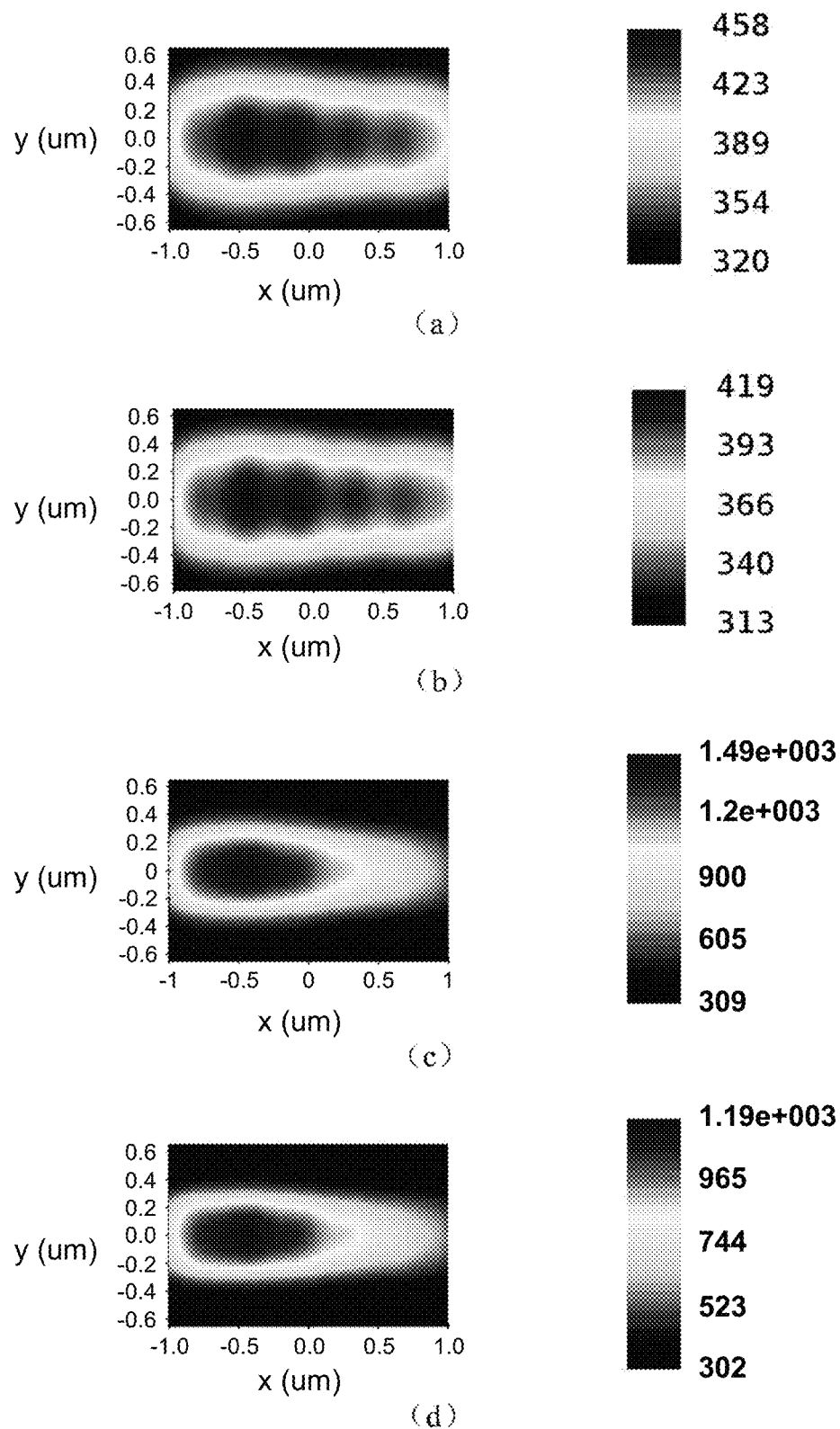
FIG. 8 is the temperature distribution diagram of the phase change functional unit after action of P1 and P0 in the amorphous state and the crystalline state provided by the disclosure (the unit of temperature is K), where (a) is the pulse P1 acting in the amorphous state, (b) is the pulse P0 acting in the amorphous state, (c) is the pulse P1 acting in a partially crystalline state, and (d) is the pulse P0 acting in a partially crystalline state.

FIG. 8 (taking $Ge_2Sb_2Te_5$ as an example) is a simulation result of changes in temperature obtained by respectively applying different pulses in an initial state of the phase change functional unit in the amorphous state and the crystalline state. The melting temperature of $Ge_2Sb_2Te_5$ is about 900 K, and the temperature of crystallization is 430 K. Let a pulse with a pulse width of 26 ns and an amplitude of 10 mW be P1, and a pulse with a pulse of 13 ns and an amplitude of 10 mW be P0. In FIG. 8, the initial state of the phase change functional unit in (a) and (b) is the amorphous state, which is respectively acted on by the pulses P1 and P0, and the initial state of the phase change functional unit in (c) and (d) is a partially crystalline state, which is respectively acted on by the pulses P1 and P0. The statistics of the maximum temperature and the phase change condition are shown in Table 1 below.

TABLE 1

Statistical table of phase change conditions in amorphous state and partially crystalline state under actions of pulses P1 and P0

|  | Amorphous | Amorphous | Partially crystalline | Partially crystalline |
|---|---|---|---|---|
| Excitation pulse | P1 | P0 | P1 | P0 |
| Maximum temperature | 458 K | 419 K | 1490 K | 1190 K |
| Phase change condition | Partially crystallized | Remain amorphized | Amorphized | Amorphized |

When the initial state of the phase change functional unit is amorphous, the temperature in some areas exceeds the temperature of crystallization under the action of the pulse P1, resulting in partial crystallization. The temperature is not enough to reach the temperature of crystallization under the action of the pulse P0, so the amorphous state is maintained. When the initial state is the partially crystalline state, amorphization can occur under the actions of both pulses P1 and P0. It can be seen that in the two initial states, after the action of the pulse P0, the amorphous state can be finally achieved, so P0 is selected as a reset pulse of the phase change functional unit to reset the phase change functional unit before each logic operation starts. The reset pulses are respectively input from the input end of M1 and the input end of M2 of the straight waveguide in FIG. 1. It is stipulated that when M1 and M2 are both in the amorphous state, an output logic value is 1 after the probe light is read, and the output logic value is 0 in the remaining cases. The correspondence may be referred to the following Table 2.

TABLE 2

Correspondence table of state of phase change unit and logic output

| M1 | M2 | Output logic value |
|---|---|---|
| Crystalline (low transmittance) | Crystalline (low transmittance) | 0 |
| Crystalline (low transmittance) | Amorphous (high transmittance) | 0 |
| Amorphous (high transmittance) | Crystalline (low transmittance) | 0 |
| Amorphous (high transmittance) | Amorphous (high transmittance) | 1 |

A logic operation process is implemented through a three-step operation, S1, S2, and S3. The phase change states of M1 and M2 are modulated according to the logic value that needs to be substituted into the computation. Table 3 shows the input pulse corresponding to the logic signal value in each operation step, where x represents that the input is empty, that is, there is no input. Table 4 shows the specific operation manners for different logic operations. When performing a logic operation, the type of the logic operation is first judged, the logic value input into M1 and M2 of each corresponding step is found in Table 4, and the pulse (P1, P0, or x) corresponding to the logic value in each step is then respectively input into M1 and M2 according to Table 3.

TABLE 3

Physical input rule table corresponding to logic signal

|  | S1 | | S2 | | S3 | |
|---|---|---|---|---|---|---|
|  | M1 | M2 | M1 | M2 | M1 | M2 |
| 0 | P1 | P0 | P0 | x | P1 | x |
| 1 | P0 | P1 | x | P1 | x | P1 |

TABLE 4

Table of all sixteen types of Boolean logic operation manners of all-photonic logic device

| Boolean logic | Input | | Output | S1 | | S2 | | S3 | |
|---|---|---|---|---|---|---|---|---|---|
|  | P | Q |  | M1 | M2 | M1 | M2 | M1 | M2 |
| TRUE |  |  | 1 | 0 | 1 | x | x | x | x |
|  | 0 | 0 | 1 | 0 | 1 | x | x | x | x |
|  | 0 | 1 | 1 | 0 | 1 | x | x | x | x |
|  | 1 | 0 | 1 | 0 | 1 | x | x | x | x |
|  | 1 | 1 | 1 | 0 | 1 | x | x | x | x |

TABLE 4-continued

Table of all sixteen types of Boolean logic operation manners of all-photonic logic device

| Boolean logic | Input P | Input Q | Output | S1 M1 | S1 M2 | S2 M1 | S2 M2 | S3 M1 | S3 M2 |
|---|---|---|---|---|---|---|---|---|---|
| FALSE | | | 0 | 1 | 0 | x | x | x | x |
| | 0 | 0 | 0 | 1 | 0 | x | x | x | x |
| | 0 | 1 | 0 | 1 | 0 | x | x | x | x |
| | 1 | 0 | 0 | 1 | 0 | x | x | x | x |
| | 1 | 1 | 0 | 1 | 0 | x | x | x | x |
| P | | | P | 0 | P | x | x | x | x |
| | 0 | 0 | 0 | 0 | 0 | x | x | x | x |
| | 0 | 1 | 0 | 0 | 0 | x | x | x | x |
| | 1 | 0 | 1 | 0 | 1 | x | x | x | x |
| | 1 | 1 | 1 | 0 | 1 | x | x | x | x |
| Q | | | Q | 0 | Q | x | x | x | x |
| | 0 | 0 | 0 | 0 | 0 | x | x | x | x |
| | 0 | 1 | 1 | 0 | 1 | x | x | x | x |
| | 1 | 0 | 0 | 0 | 0 | x | x | x | x |
| | 1 | 1 | 1 | 0 | 1 | x | x | x | x |
| NOT P | | | $\bar{P}$ | P | 1 | x | x | x | x |
| | 0 | 0 | 1 | 0 | 1 | x | x | x | x |
| | 0 | 1 | 1 | 0 | 1 | x | x | x | x |
| | 1 | 0 | 0 | 1 | 1 | x | x | x | x |
| | 1 | 1 | 0 | 1 | 1 | x | x | x | x |
| NOT Q | | | $\bar{Q}$ | Q | 1 | x | x | x | x |
| | 0 | 0 | 1 | 0 | 1 | x | x | x | x |
| | 0 | 1 | 0 | 1 | 1 | x | x | x | x |
| | 1 | 0 | 1 | 0 | 1 | x | x | x | x |
| | 1 | 1 | 0 | 1 | 1 | x | x | x | x |
| P AND Q | | | PQ | 0 | Q | P | x | x | x |
| | 0 | 0 | 0 | 0 | 0 | 0 | x | x | x |
| | 0 | 1 | 0 | 0 | 1 | 0 | x | x | x |
| | 1 | 0 | 0 | 0 | 0 | 1 | x | x | x |
| | 1 | 1 | 1 | 0 | 1 | 1 | x | x | x |
| P NAND Q | | | $\bar{P}+\bar{Q}$ | 0 | $\bar{P}$ | x | $\bar{Q}$ | x | x |
| | 0 | 0 | 1 | 0 | 1 | x | 1 | x | x |
| | 0 | 1 | 1 | 0 | 1 | x | 0 | x | x |
| | 1 | 0 | 1 | 0 | 0 | x | 1 | x | x |
| | 1 | 1 | 0 | 0 | 0 | x | 0 | x | x |
| P OR Q | | | P+Q | 0 | P | x | Q | x | x |
| | 0 | 0 | 0 | 0 | 0 | x | 0 | x | x |
| | 0 | 1 | 1 | 0 | 0 | x | 1 | x | x |
| | 1 | 0 | 1 | 0 | 1 | x | 0 | x | x |
| | 1 | 1 | 1 | 0 | 1 | x | 1 | x | x |
| P NOR Q | | | $\overline{PQ}$ | 0 | $\bar{Q}$ | $\bar{P}$ | x | x | x |
| | 0 | 0 | 1 | 0 | 1 | 1 | x | x | x |
| | 0 | 1 | 0 | 0 | 0 | 1 | x | x | x |
| | 1 | 0 | 0 | 0 | 1 | 0 | x | x | x |
| | 1 | 1 | 0 | 0 | 0 | 0 | x | x | x |
| P IMP Q | | | $\bar{P}+Q$ | 0 | $\bar{P}$ | x | Q | x | x |
| | 0 | 0 | 1 | 0 | 1 | x | 0 | x | x |
| | 0 | 1 | 1 | 0 | 1 | x | 1 | x | x |
| | 1 | 0 | 0 | 0 | 0 | x | 0 | x | x |
| | 1 | 1 | 1 | 0 | 0 | x | 1 | x | x |
| P NIMP Q | | | $P\bar{Q}$ | 0 | $\bar{Q}$ | P | x | x | x |
| | 0 | 0 | 0 | 0 | 1 | 0 | x | x | x |
| | 0 | 1 | 0 | 0 | 0 | 0 | x | x | x |
| | 1 | 0 | 1 | 0 | 1 | 1 | x | x | x |
| | 1 | 1 | 0 | 0 | 0 | 1 | x | x | x |
| P RIMP Q | | | $P+\bar{Q}$ | 0 | P | x | $\bar{Q}$ | x | x |
| | 0 | 0 | 1 | 0 | 0 | x | 1 | x | x |
| | 0 | 1 | 0 | 0 | 0 | x | 0 | x | x |
| | 1 | 0 | 1 | 0 | 1 | x | 1 | x | x |
| | 1 | 1 | 1 | 0 | 1 | x | 0 | x | x |
| P RNIMP Q | | | $\bar{P}Q$ | 0 | Q | $\bar{P}$ | x | x | x |
| | 0 | 0 | 0 | 0 | 0 | 1 | x | x | x |
| | 0 | 1 | 1 | 0 | 1 | 1 | x | x | x |
| | 1 | 0 | 0 | 0 | 0 | 0 | x | x | x |
| | 1 | 1 | 0 | 0 | 1 | 0 | x | x | x |
| P XOR Q | | | $P\bar{Q}+\bar{P}Q$ | P | P | x | Q | Q | x |
| | 0 | 0 | 0 | 0 | 0 | x | 0 | 0 | x |
| | 0 | 1 | 1 | 0 | 0 | x | 1 | 1 | x |
| | 1 | 0 | 1 | 1 | 1 | x | 0 | 0 | x |
| | 1 | 1 | 0 | 1 | 1 | x | 1 | 1 | x |
| P XNOR Q | | | $(\bar{P}+Q)\cdot(P+\bar{Q})$ | 0 | $\bar{P}$ | P | Q | Q | $\bar{P}$ |
| | 0 | 0 | 1 | 0 | 1 | 0 | 0 | 0 | 1 |
| | 0 | 1 | 0 | 0 | 1 | 0 | 1 | 1 | 1 |
| | 1 | 0 | 0 | 0 | 0 | 1 | 0 | 0 | 0 |
| | 1 | 1 | 1 | 0 | 0 | 1 | 1 | 1 | 0 |

Preferably, the 16 types of binary Boolean logic operations include logic true (True), logic false (False), P, Q, not P (NOTP), not Q (NOTQ), P and Q (PANDQ), P and not Q (PNANDQ), P or Q (PORQ), P or not Q (PNORQ), P implies Q (PIMPQ), P implies not Q (PNIMPQ), P inverse implies Q (PRIMPQ), P inverse implies not Q (PRNIMPQ), P exclusive OR Q (PXORQ), and P exclusive NOR Q (PXNORQ) logic operations. For details, see Table 4. The sixteen types of binary logic operations are as follows.

(1) True: in the operation S1, 0 and 1 are respectively input into the input ends of M1 and M2; in the operation S2, x and x respectively are input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation True=1 is implemented.

When P=0 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation True=1 is implemented.

When P=1 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation True=1 is implemented.

When P=1 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation True=1 is implemented.

(2) False: in the operation S1, 1 and 0 are respectively input into the input ends of M1 and M2; in the operation S2, x and x are respectively input into the input ends of M1 and M2; and in the operation S3, x and x are respectively input into the input ends of M1 and M2.

When P=0 and Q=0, after the operation S1, M1 is in the crystalline state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation False=0 is implemented.

When P=0 and Q=1, after the operation S1, M1 is in the crystalline state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation False=0 is implemented.

When P=1 and Q=0, after the operation S1, M1 is in the crystalline state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation False=0 is implemented.

When P=1 and Q=1, after the operation S1, M1 is in the crystalline state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation False=0 is implemented.

(3) P: in the operation S1, 0 and P are respectively input into the input ends of M1 and M2; in the operation S2, x and x are respectively input into the input ends of M1 and M2; and in the operation S3, x and x are respectively input into the input ends of M1 and M2.

When P=0 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation P=0 is implemented.

When P=0 and Q=1, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation P=0 is implemented.

When P=1 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation P=1 is implemented.

When P=1 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation P=1 is implemented.

(4) Q: in the operation S1, 0 and Q are respectively input into the input ends of M1 and M2; in the operation S2, x and x are respectively input into the input ends of M1 and M2; and in the operation S3, x and x are respectively input into the input ends of M1 and M2.

When P=0 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation Q=0 is implemented.

When P=0 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation Q=1 is implemented.

When P=1 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation Q=0 is implemented.

When P=1 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation Q=1 is implemented.

(5) NOTP: in the operation S1, P and 1 are respectively input into the input ends of M1 and M2; in the operation S2, x and x are respectively input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation NOTP=1 is implemented.

When P=0 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation NOTP=1 is implemented.

When P=1 and Q=0, after the operation S1, M1 is in the crystalline state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation NOTP=0 is implemented.

When P=1 and Q=1, after the operation S1, M1 is in the crystalline state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation NOTP=0 is implemented.

(6) NOTQ: in the operation S1, Q and 1 are respectively input into the input ends of M1 and M2; in the operation S2, x and x are respectively input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation NOTQ=1 is implemented.

When P=0 and Q=1, after the operation S1, M1 is in the crystalline state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation NOTQ=0 is implemented.

When P=1 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation NOTQ=1 is implemented.

When P=1 and Q=1, after the operation S1, M1 is in the crystalline state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation NOTQ=0 is implemented.

(7) PANDQ: in the operation S1, 0 and Q are respectively input into the input ends of M1 and M2; in the operation S2, P and x are respectively input into the input ends of M1 and M2; and in the operation S3, x and x are respectively input into the input ends of M1 and M2.

When P=0 and Q=0, after the operation S1, M1 is in the amorphous state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation PANDQ=0 AND 0=0 is implemented.

When P=0 and Q=1, after the operation S1, M1 is in the amorphous state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation PANDQ=0 AND 1=0 is implemented.

When P=1 and Q=0, after the operation S1, M1 is in the amorphous state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation PANDQ=1 AND 0=0 is implemented.

When P=1 and Q=1, after the operation S1, M1 is in the amorphous state and M2 is in the amorphous state; after the operation S2, M1 is in the amorphous state and M2 is in the amorphous state; after the operation of S3, M1 is in the amorphous state and M2 is in the amorphous state, so the output signal value is 1. The logic operation PANDQ=1 AND 1=1 is implemented.

(8) PNANDQ: in the operation S1, 0 and P are respectively input into the input ends of M1 and M2; in the operation S2, x and $\overline{Q}$ are respectively input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PNANDQ=0 NAND 0=1 is implemented.

When P=0 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PNANDQ=0 NAND 1=1 is implemented.

When P=1 and Q=0, after the operation S1, M1 is in the amorphous state and M2 is in the crystalline state; after the operation S2, M1 is in the amorphous state and M2 is in the amorphous state; and after the operation S3, M1 is in the amorphous state and M2 is in the amorphous state, so the output signal value is 1. The logic operation PNANDQ=1 NAND 0=1 is implemented.

When P=1 and Q=1, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PNANDQ=1 NAND1=0 is implemented.

(9) PORQ: in the operation S1, 0 and P are respectively input into the input ends of M1 and M2; in the operation S2, x and Q are respectively input into the input ends of M1 and M2; and in the operation S3, x and x are respectively input into the input ends of M1 and M2.

When P=0 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PORQ=0 OR 0=0 is implemented.

When P=0 and Q=1, after the operation S1, M1 is in the amorphous state and M2 is in the crystalline state; after the operation S2, M1 is in the amorphous state and M2 is in the amorphous state; and after the operation S3, M1 is in the amorphous state and M2 is in the amorphous state, so the output signal value is 1. The logic operation PORQ=0 OR 1=1 is implemented.

When P=1 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PORQ=1 OR 0=1 is implemented.

When P=1 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PORQ=1 OR 1=1 is implemented.

(10) PNORQ: in the operation S1, 0 and $\overline{Q}$ are respectively input into the input ends of M1 and M2; in the operation S2, $\overline{P}$ and x are respectively input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PNORQ=0 NOR 0=1 is implemented.

When P=0 and Q=1, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PNORQ=0 NOR 1=0 is implemented.

When P=1 and Q=0, after the operation S1, M1 is in the amorphous state and M2 is in the amorphous state; after the operation S2, M1 is in the amorphous state and M2 is in the crystalline state; and after the operation S3, M1 is in the amorphous state and M2 is in the crystalline state, so the output signal value is 0. The logic operation PNORQ=1 NOR 0=0 is implemented.

When P=1 and Q=1, after the operation S1, M1 is in the amorphous state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation PNORQ=1 NOR 1=0 is implemented.

(11) PIMPQ: in the operation S1, 0 and P are respectively input into the input ends of M1 and M2; in the operation S2, x and Q are respectively input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PIMPQ=0 IMP 0=1 is implemented.

When P=0 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PIMPQ=0 IMP 1=1 is implemented.

When P=1 and Q=0, after the operation S1, M1 is in the amorphous state and M2 is in the amorphous state; after the operation S2, M1 is in the amorphous state and M2 is in the crystalline state; and after the operation S3, M1 is in the amorphous state and M2 is in the crystalline state, so the output signal value is 0. The logic operation PIMPQ=1 IMP 0=0 is implemented.

When P=1 and Q=1, after the operation S1, M1 is in the amorphous state and M2 is in the crystalline state; after the operation S2, M1 is in the amorphous state and M2 is in the amorphous state; and after the operation S3, M1 is in the amorphous state and M2 is in the amorphous state, so the output signal value is 1. The logic operation PIMPQ=1 IMP 1=1 is implemented.

(12) PNIMPQ: in the operation S1, 0 and $\overline{Q}$ are respectively input into the input ends of M1 and M2; in the operation S2, P and x are respectively input into the input ends of M1 and M2; and in the operation S3, x and x are respectively input into the input ends of M1 and M2.

When P=0 and Q=0, after the operation S1, M1 is in the amorphous state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation PNIMPQ=0 NIMP 0=0 is implemented.

When P=0 and Q=1, after the operation S1, M1 is in the amorphous state and M2 is in the crystalline state; after the operation S2, M1 is in the crystalline state and M2 is in the crystalline state; and after the operation S3, M1 is in the crystalline state and M2 is in the amorphous state, so the output signal value is 0. The logic operation PNIMPQ=0 NIMP 1=0 is implemented.

When P=1 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PNIMPQ=1 NIMP 0=1 is implemented.

When P=1 and Q=1, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PNIMPQ=1 NIMP 1=0 is implemented.

(13) PRIMPQ: in the operation S1, 0 and P are respectively input into the input ends of M1 and M2; in the operation S2, x and $\overline{Q}$ are respectively input into the input ends of M1 and M2; and in the operation S3, x and x are respectively input into the input ends of M1 and M2.

When P=0 and Q=0, after the operation S1, M1 is in the amorphous state and M2 is in the crystalline state; after the operation S2, M1 is in the amorphous state and M2 is in the amorphous state; and after the operation S3, M1 is in the amorphous state and M2 is in the amorphous state, so the output signal value is 1. The logic operation PRIMPQ=0 RIMP 0=1 is implemented.

When P=0 and Q=1, after the operation S1, M1 is in the amorphous state and M2 is in the crystalline state; after the operation S2, M1 is in the amorphous state and M2 is in the crystalline state; and after the operation S3, M1 is in the amorphous state and M2 is in the amorphous state, so the output signal value is 0. The logic operation PRIMPQ=0 RIMP 1=0 is implemented.

When P=1 and Q=0, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PRIMPQ=1 RIMP 0=1 is implemented.

When P=1 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PRIMPQ=1 RIMP 0=1 is implemented.

(14) PRNIMPQ: in the operation S1, 0 and Q are respectively input into the input ends of M1 and M2; in the operation S2, $\overline{P}$ and x are respectively input into the input ends of M1 and M2; and in the operation S3, x and x are respectively input into the input ends of M1 and M2.

When P=0 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PRNMPQ=0 RNIMP 0=0 is implemented.

When P=0 and Q=1, after the operation S1, M1 is in the amorphous state and M2 is in the amorphous state; after the operation S2, M1 is in the amorphous state and M2 is in the amorphous state; and after the operation S3, M1 is in the amorphous state and M2 is in the amorphous state, so the output signal value is 1. The logic operation PRNMPQ=0 RNIMP 1=1 is implemented.

When P=1 and Q=0, after the operation S1, M1 is in the amorphous state and M2 is in the crystalline state; after the operation S2, M1 is in the crystalline state and M2 is in the crystalline state; and after the operation S3, M1 is in the crystalline state and M2 is in the crystalline state, so the output signal value is 0. The logic operation PRNMPQ=1 RNIMP 0=0 is implemented.

When P=1 and Q=1, after the operation S1, M1 is in the amorphous state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation PRNMPQ=1 RNIMP 1=0 is implemented.

(15) PXORQ: in the operation S1, P and P are respectively input into the input ends of M1 and M2; in the operation S2, x and Q are respectively input into the input ends of M1 and M2; and in the operation S3, Q and x are respectively input into the input ends of M1 and M2.

When P=0 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PXORQ=0 XOR 0=0 is implemented.

When P=0 and Q=1, after the operation S1, M1 is in the amorphous state and M2 is in the crystalline state; after the operation S2, M1 is in the amorphous state and M2 is in the amorphous state; and after the operation S3, M1 is in the amorphous state and M2 is in the amorphous state, so the output signal value is 1. The logic operation PXORQ=0 XOR 1=1 is implemented.

When P=1 and Q=0, after the operation S1, M1 is in the crystalline state and M2 is in the amorphous state; after the operation S2, M1 is in the crystalline state and M2 is in the amorphous state; and after the operation S3, M1 is in the amorphous state and M2 is in the amorphous state, so the output signal value is 1. The logic operation PXORQ=1 XOR 0=1 is implemented.

When P=1 and Q=1, after the operation S1, M1 is in the crystalline state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation PXORQ=1 XOR 1=0 is implemented.

(16) PXNORQ: in the operation S1, 0 and P are respectively input into the input ends of M1 and M2; in the operation S2, P and Q are respectively input into the input ends of M1 and M2; and in the operation S3, Q and $\overline{P}$ are respectively input into the input ends of M1 and M2.

When P=0 and Q=0, after the operation S1, M1 is in the amorphous state and M2 is in the amorphous state; after the operation S2, M1 is in the crystalline state and M2 is in the amorphous state; and after the operation S3, M1 is in the amorphous state and M2 is in the amorphous state, so the output signal value is 1. The logic operation PXNORQ=0 XNOR 0=1 is implemented.

When P=0 and Q=1, after the operation S1, M1 is in the amorphous state and M2 is in the amorphous state; after the operation S2, M1 is in the crystalline state and M2 is in the amorphous state; and after the operation S3, M1 is in the crystalline state and M2 is in the amorphous state, so the output signal value is 0. The logic operation PXNORQ=0 XNOR 1=0 is implemented.

When P=1 and Q=0, after the operation S1, M1 is in the amorphous state and M2 is in the crystalline state; after the operation S2, M1 is in the amorphous state and M2 is in the crystalline state; and after the operation S3, M1 is in the amorphous state and M2 is in the crystalline state, so the output signal value is 0. The logic operation PXNORQ=1 XNOR 0=0 is implemented.

When P=1 and Q=1, after the operation S1, M1 is in the amorphous state and M2 is in the crystalline state; after the operation S2, M1 is in the amorphous state and M2 is in the amorphous state; and after the operation S3, M1 is in the amorphous state and M2 is in the amorphous state, so the output signal value is 1. The logic operation PXNORQ=1 XNOR 1=1 is implemented.

The disclosure provides a straight waveguide phase change all-photonic Boolean logic device and a full binary logic implementation method thereof. The device includes a straight waveguide structure, a phase change functional unit covered on top of a waveguide and a protective layer thereof, and a waveguide Bragg grating structure. In terms of the logic implementation method, optical pulses are respectively input from two ends of the device to modulate the state of the phase change functional unit. The pump optical pulse with a specific wavelength and a relatively large power is adopted to respectively perform the write operation on the phase change functional units, so that the temperature is increased and a crystalline or amorphous phase change is generated, resulting in differences in optical properties in the two states. When reading the state, the probe light is input from one end of the device, and is output from the other end to detect the power change thereof. Another probe optical pulse with a specific wavelength and a relatively small power is adopted to read the state of the phase change functional unit without changing the state of the phase change material. The parameter of the waveguide Bragg grating structure is set to reflect the wavelength where the pump optical pulse is located, so that the write pulses input from the two ends only act on the phase change functional unit closest to the port. The probe optical pulse with a specific wavelength is selected, and the probe light under the wavelength is less reflected by the waveguide Bragg grating and does not affect the reading of the state of the device. After resetting the phase change functional unit, through respectively defining the input logic signals, and defining the three operation steps, the reconfigurable logic of the operation manner can be implemented. Through step-by-step operations, all 16 types of binary Boolean logic operations are implemented in the simple structure. The structure has symmetry. The input and output ends may be interchanged during the reading process. Compared with the electrical logic gate, the disclosure has advantages such as anti-electromagnetic interference and parallel operation. The phase change material has good long-term non-volatility as a storage medium. The combination of storage and computing is of great significance to the research on the integration of storage and computing, and through the reconfigurable solution method of the operation manner, the functions of the 16 types of binary Boolean logic operation are implemented, which greatly improves the work efficiency of logic operation.

The above examples are only used to illustrate the disclosure, wherein the structural parameters, materials, manufacturing process, logic operation parameters, etc. of each component can be changed. All equivalent transformations and improvements based on the disclosure should not be excluded from the protection scope of the disclosure.

Persons skilled in the art can easily understand that the above descriptions are only preferred embodiments of the disclosure and are not intended to limit the disclosure. Any modifications, equivalent replacements, improvements, etc. made within the spirit and principles of the disclosure should be included within the protection scope of the disclosure.

What is claimed is:

1. A straight waveguide phase change all-photonic Boolean logic device, comprising: a straight waveguide, two phase change functional units, and a Bragg grating, wherein
on the upper surface of the straight waveguide there is a ridge, the two phase change functional units and the Bragg grating are all disposed on the ridge; the Bragg grating is located between the two phase change functional units and is in a straight line with the two phase change functional units;
based on an evanescent wave coupling effect, an optical pulse signal with a relatively large power is input into the straight waveguide from any one of the two ends, the phase change functional unit near the end absorbs a part of the relatively large power and generates a crystalline or amorphous phase change to implement a write operation; when the two phase change functional units have different state combinations, transmittance of a detection optical signal would be different accordingly, which is used to implement a reading operation; when the write operation is performed on one phase change functional unit, the optical pulse signal transmitted from one side of the Bragg grating does not act on the other phase change functional unit of the two phase change functional units on other side;
through the writing write operation and the reading operation on the two phase change functional units, the straight waveguide phase change all-photonic Boolean logic device implements functions of all 16 types of binary Boolean logic operations.

2. The straight waveguide phase change all-photonic Boolean logic device according to claim 1, wherein a material of each of the two phase change functional units is a chalcogenide compound that generates a crystalline or amorphous reversible phase change under an action of different optical pulses.

3. The straight waveguide phase change all-photonic Boolean logic device according to claim 1, wherein a real part of a complex refractive index of the two phase change functional units is larger than a real part of a complex refractive index of the straight waveguide, so that a part of light propagating in the straight waveguide enters the phase change functional units for propagation;
an imaginary part of the complex refractive index of the phase change functional units is not 0, so that the phase change functional units absorb the light propagated therein.

4. The straight waveguide phase change all-photonic Boolean logic device according to claim 3, wherein the complex refractive indexes mentioned in the real part of the complex refractive index of each of the two phase change functional units being larger than the real part of the complex refractive index of the straight waveguide and the imaginary part of the complex refractive index of each of the two phase change functional units being not 0 refers to the complex refractive indexes of the two phase change functional units and the straight waveguide under two wavelengths of a pump optical pulse signal and a detection signal.

5. The straight waveguide phase change all-photonic Boolean logic device according to claim 1, wherein the 16 types of binary Boolean logic operations comprise logic true, logic false, P, Q, not P, not Q, P and Q, P and not Q, P or Q, P or not Q, P implies Q, P implies not Q, P inverse implies Q, P inverse implies not Q, P exclusive OR Q, and P exclusive NOR Q logic operations.

6. The straight waveguide phase change all-photonic Boolean logic device according to claim 1, wherein the optical pulse signal is input into a side of the straight waveguide where the first phase change functional unit is located, the first phase change functional unit heats up by absorbing the optical power thereby to induce the crystalline or amorphous phase change, so that the first phase change functional unit is finally in the crystalline state or in the amorphous state, so as to perform the write operation on the first phase change functional unit;
through setting parameters of the Bragg grating, after the optical pulse signal incident from one end of the straight waveguide passes through the Bragg grating, the transmitted optical pulse signal does not act on the second phase change functional unit on the other side of the straight waveguide.

7. The straight waveguide phase change all-photonic Boolean logic device according to claim 1, wherein a detection signal is input into one end of the straight waveguide, an intensity of an optical signal output from the other end of the straight waveguide is detected and compared with an intensity of the input detection signal to determine transmittance of the two phase change functional units, so as to perform the reading operation on the two phase change functional units, the detection signal is an optical pulse or a continuous light with a relatively low power that does not change states of the two phase change functional units; through setting parameters of the Bragg grating, the detection signal is not affected by the Bragg grating.

8. The straight waveguide phase change all-photonic Boolean logic device according to claim 1, wherein each of the two phase change functional units comprises a phase change functional unit layer and a protective layer from bottom to top; the protective layer is used to prevent the two phase change functional units from being oxidized.

9. The straight waveguide phase change all-photonic Boolean logic device according to claim 1, wherein a material of the Bragg grating is same as a material of the straight waveguide.

10. A full binary logic implementation method of a straight waveguide phase change all-photonic Boolean logic device according to claim 1, comprising:
presetting a detection signal to detect that the two phase change functional units are both in the amorphous state, wherein a logic value output by the detection signal after reading the two phase change functional units is 1, and logic values output in other cases are all 0;
presetting a three-step operation to respectively input the corresponding logic values into the two phase change functional units; presetting operation manners of 16 types of binary Boolean logic operations to respectively input the logic values into the two phase change functional units with the three-step operation, and then input the detection signal into one side of the straight waveguide to read states of the two phase change functional units through detecting an intensity of a signal output from the other side of the straight waveguide, and comparing with an intensity of the input detection signal to obtain a result after the Boolean logic operation, so as to implement a full binary Boolean logic operation, wherein inputting the logic values into the two phase change functional units refers to inputting corresponding write optical pulse signals into the two phase change functional units using the three-step operation, wherein the three-step operation comprises:

when logic 0 is input into the first phase change functional unit, in a first operation step a first optical pulse signal is input into the straight waveguide from an end where the first phase change functional unit locates, in the second operation step a second optical pulse signal is input into the straight waveguide from the end where the first phase change functional unit locates, in the third operation step the first optical pulse signal is input into the straight waveguide from the end where the first phase change functional unit locates;

when logic 1 is input into the first phase change functional unit, in the first operation step the second optical pulse signal is input into the straight waveguide from the end where the first phase change functional unit locates, and the optical pulse signal is not input into the straight waveguide in both the second operation step and the third operation step;

when logic 0 is input into the second phase change functional unit, in the first operation step the second optical pulse signal is input into the straight waveguide from the end where the second phase change functional unit locates, and the optical pulse signal is not input into the straight waveguide from the end where the second phase change functional unit locates in both the second and third operation steps; and when logic 1 is input into the second phase change functional unit, in the first operation step, the second operation step, and the third operation step, the first optical pulse signal is input into the straight waveguide from the end where the second phase change functional unit locates.

* * * * *